US012723895B2

(12) United States Patent
Haas

(10) Patent No.: US 12,723,895 B2
(45) Date of Patent: Sep. 1, 2026

(54) METHOD, METER, AND SYSTEM FOR DATA AUDIT TRAIL

(71) Applicant: Landis+Gyr AG, Cham (CH)

(72) Inventor: Jürg Haas, Rotkreuz (CH)

(73) Assignee: LANDIS+GYR AG, Cham (CH)

( * ) Notice: Subject to any disclaimer, the term of this patent is extended or adjusted under 35 U.S.C. 154(b) by 143 days.

(21) Appl. No.: 18/555,311

(22) PCT Filed: Dec. 1, 2021

(86) PCT No.: PCT/EP2021/083823
§ 371 (c)(1),
(2) Date: Oct. 13, 2023

(87) PCT Pub. No.: WO2022/218563
PCT Pub. Date: Oct. 20, 2022

(65) Prior Publication Data

US 2024/0200982 A1 Jun. 20, 2024

(30) Foreign Application Priority Data

Apr. 16, 2021 (CH) .................................... 00401/21

(51) Int. Cl.
*G01D 4/00* (2006.01)
*H04L 9/00* (2022.01)
(Continued)

(52) U.S. Cl.
CPC ............... *G01D 4/004* (2013.01); *H04L 9/30* (2013.01); *H04L 9/3236* (2013.01); *H04L 9/3247* (2013.01); *H04L 9/3297* (2013.01)

(58) Field of Classification Search
CPC ......... G01D 4/004; H04L 9/30; H04L 9/3236; H04L 9/3247; H04L 9/3297; H04L 9/50; H04L 2209/60
See application file for complete search history.

(56) References Cited

U.S. PATENT DOCUMENTS 5,812,990 A 9/1998 Ryan, Jr. et al.
9,729,327 B2 * 8/2017 Dayka .................. H04L 9/3247
(Continued)

FOREIGN PATENT DOCUMENTS

CN 1658555 A 8/2005
CN 102216735 A 10/2011
(Continued)

OTHER PUBLICATIONS

Simply Explained, How does a blockchain work (Youtube—https://www.youtube.com/watch?v=SSo_ElwHSd4&t=69s) (Year: 2017).*
(Continued)

*Primary Examiner* — Steven Lim
*Assistant Examiner* — Jerold B Murphy
(74) *Attorney, Agent, or Firm* — Tarolli, Sundheim, Covell & Tummino LLP

(57) ABSTRACT

The present invention relates to a method of establishing a data audit trail for meter data of a meter. The method comprises the steps of capturing a meter dataset comprising at least a first value and a second value, signing the meter dataset with a first digital signature, and subsequently signing a next meter dataset and the first digital signature with a second digital signature.

12 Claims, 6 Drawing Sheets

| capturing source and sort sequence | Status | Value / event # 1 | Value / event # 2 | Value / event # 3 | Value / event # n | Signature over the previous row | Signature over the whole row |
|---|---|---|---|---|---|---|---|
| Time | Status | Value | Value | Value | Value | | Signature 1 |
| Time + 1 | Status | Value | Value | Value | Value | Signature 1 | Signature 2 |
| Time + 2 | Status | Value | Value | Value | Value | Signature 2 | Signature 3 |
| Time + 3 | Status | Value | Value | Value | Value | Signature 3 | Signature 4 |
| Time + 4 | Status | Value | Value | Value | Value | Signature 4 | Signature 5 |
| Time + n | Status | Value | Value | Value | Value | Signature n-1 | Signature n |

(51) Int. Cl.

| | |
|---|---|
| ***H04L 9/30*** | (2006.01) |
| ***H04L 9/32*** | (2006.01) |

(56) References Cited

U.S. PATENT DOCUMENTS

| | | | | |
|---|---|---|---|---|
| 11,863,589 | B2 * | 1/2024 | Koval | H04L 63/104 |
| 2006/0206433 | A1 * | 9/2006 | Scoggins | G06Q 50/06 705/63 |
| 2011/0016535 | A1 | 1/2011 | Zhou | |
| 2014/0351932 | A1 | 11/2014 | Abraham et al. | |
| 2014/0365026 | A1 | 12/2014 | Komano et al. | |
| 2017/0004168 | A1 | 1/2017 | Hakala et al. | |
| 2018/0232819 | A1 * | 8/2018 | Stöcker | G01D 4/004 |
| 2019/0086235 | A1 * | 3/2019 | Cui | H02J 13/1337 |
| 2019/0311443 | A1 * | 10/2019 | Blades | H04L 9/3239 |
| 2019/0323858 | A1 * | 10/2019 | Wilkinson | H04L 9/50 |
| 2020/0148072 | A1 | 5/2020 | Ashley et al. | |
| 2020/0266987 | A1 * | 8/2020 | Goodman | H04L 9/3263 |
| 2020/0389499 | A1 * | 12/2020 | Koval | H04L 63/104 |

FOREIGN PATENT DOCUMENTS

| | | | | | |
|---|---|---|---|---|---|
| CN | 103416021 | A | | 11/2013 | |
| CN | 106712937 | A | * | 5/2017 | H04L 69/22 |
| EP | 854446 | | * | 12/1997 | |
| EP | 0851630 | B1 | * | 4/2009 | G06Q 20/401 |
| JP | 2005236442 | A | | 9/2005 | |
| JP | 2011022743 | A | | 2/2011 | |
| JP | 2014241465 | A | | 12/2014 | |
| JP | 2016520271 | A | | 7/2016 | |
| JP | 2018523369 | A | | 8/2018 | |
| KR | 101391628 | B1 | | 5/2014 | |
| KR | 20210066509 | A | * | 6/2021 | H04L 9/3273 |
| WO | 2017049309 | A1 | | 3/2017 | |

OTHER PUBLICATIONS

CN-106712937-A English Language Translation (Year: 2017).*

KR-20210066509-A English Language Translation (Year: 2021).*

Raphaelle Akhras, et al., Securing Smart Grid Communication using Ethereum Smart Contracts, 2020 International Wireless Communications and Mobile Computing (IWCMC), IEEE, 2020, pp. 1672-1678.

International Search Report and Written Opinion of International Patent Application No. PCT/EP2021/083823, dated Feb. 25, 2022, 10 pages.

Office Action for SG application No. 11202307714Q, dated Oct. 15, 2025, 10 pages.

Office Action for JP application No. 2023-563284, dated Dec. 23, 2025, 4 pages.

Office Action for CN application No. 202180099098.9, dated Apr. 14, 2026, 16 pages.

* cited by examiner

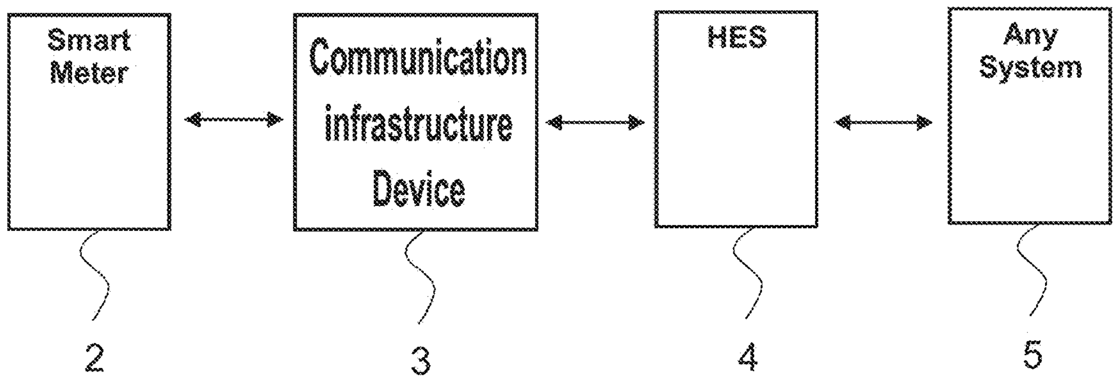
Fig. 1
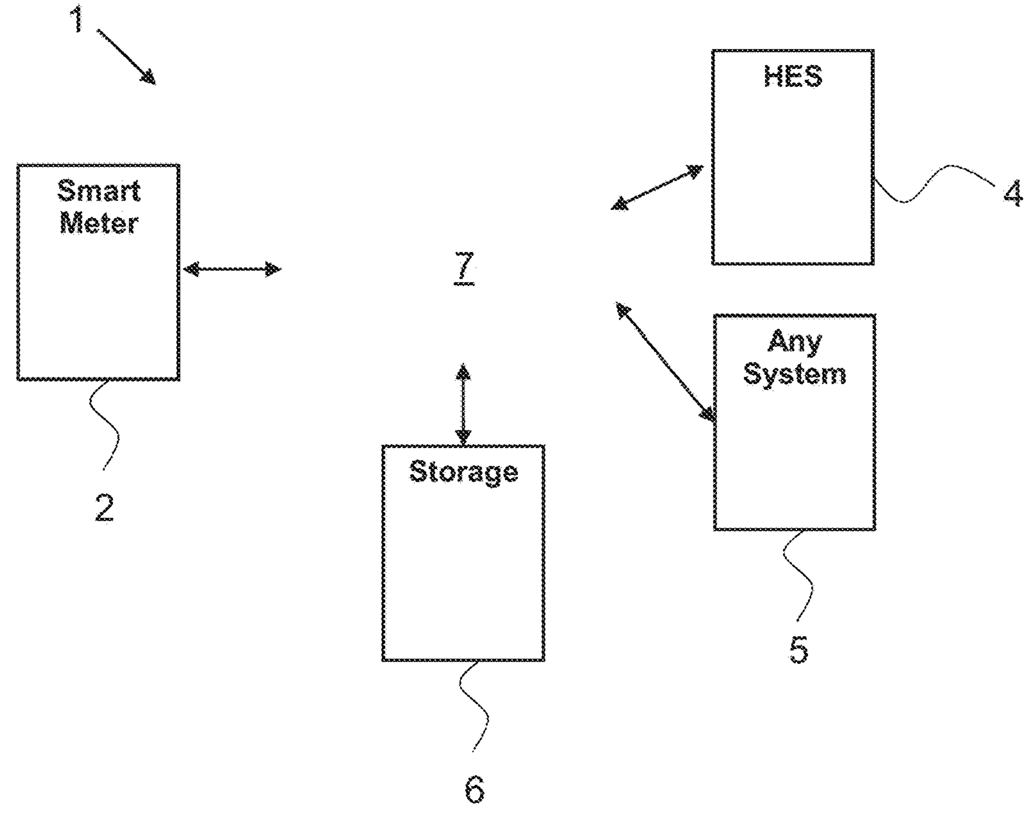
Fig. 2

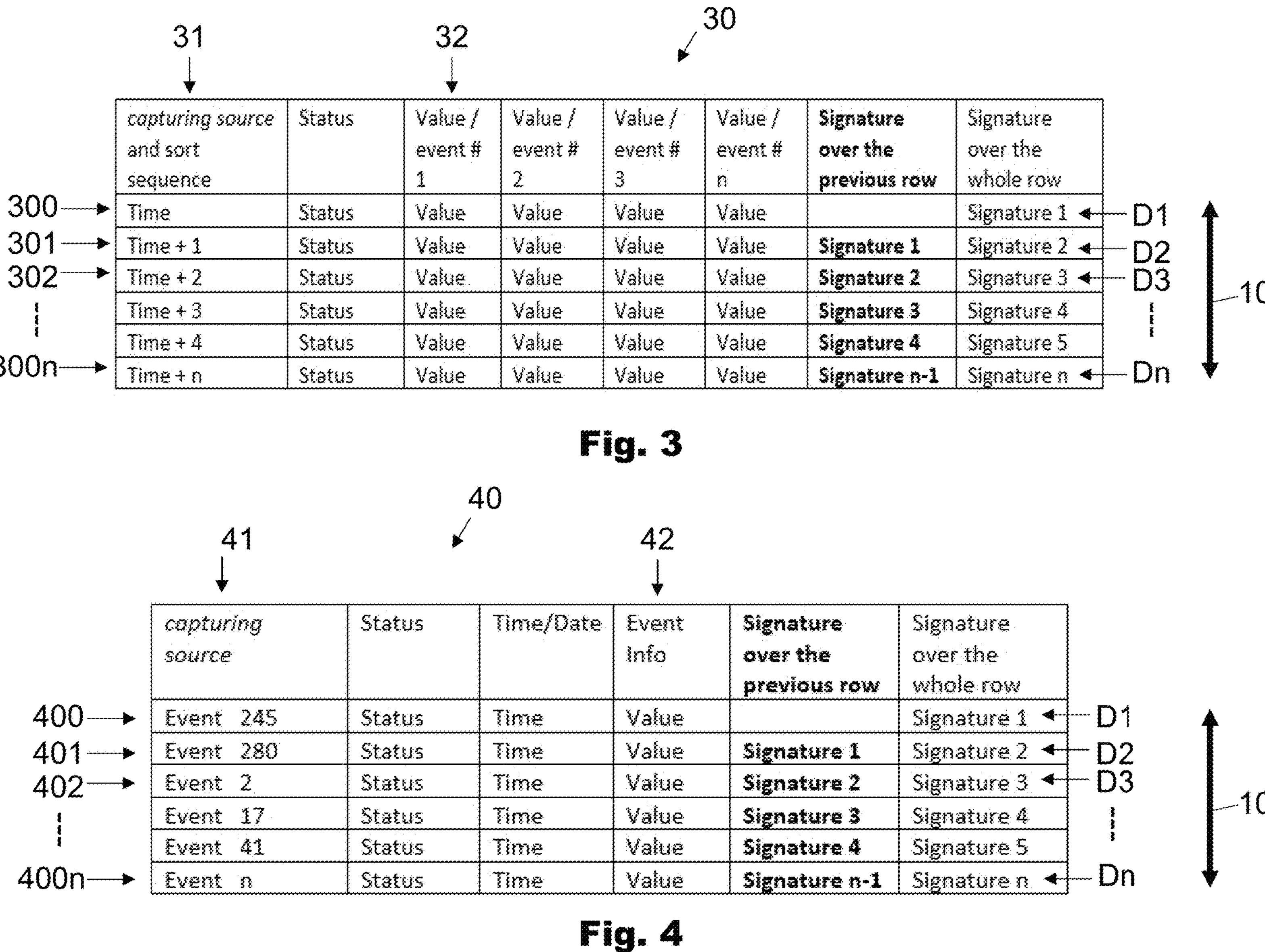

| capturing source and sort sequence | Status | Value / event # 1 | Value / event # 2 | Value / event # 3 | Value / event # n | **Signature over the previous row** | Signature over the whole row |
|---|---|---|---|---|---|---|---|
| Time | Status | Value | Value | Value | Value | | Signature 1 |
| Time + 1 | Status | Value | Value | Value | Value | **Signature 1** | Signature 2 |
| Time + 2 | Status | Value | Value | Value | Value | **Signature 2** | Signature 3 |
| Time + 3 | Status | Value | Value | Value | Value | **Signature 3** | Signature 4 |
| Time + 4 | Status | Value | Value | Value | Value | **Signature 4** | Signature 5 |
| Time + n | Status | Value | Value | Value | Value | **Signature n-1** | Signature n |

Fig. 3

| capturing source | Status | Time/Date | Event Info | **Signature over the previous row** | Signature over the whole row |
|---|---|---|---|---|---|
| Event 245 | Status | Time | Value | | Signature 1 |
| Event 280 | Status | Time | Value | **Signature 1** | Signature 2 |
| Event 2 | Status | Time | Value | **Signature 2** | Signature 3 |
| Event 17 | Status | Time | Value | **Signature 3** | Signature 4 |
| Event 41 | Status | Time | Value | **Signature 4** | Signature 5 |
| Event n | Status | Time | Value | **Signature n-1** | Signature n |

Fig. 4

METHOD, METER, AND SYSTEM FOR DATA AUDIT TRAIL

CROSS-REFERENCE TO RELATED APPLICATIONS

This application is a U.S. National Stage Application filed under 35 U.S.C. § 371 of PCT/EP2021/083823, filed Dec. 1, 2021, and entitled "METHOD, METER, AND SYSTEM FOR DATA AUDIT TRAIL", which claims priority from Swiss Patent Application No. 00401/21, filed on Apr. 16, 2021. The entire contents of each of the above-identified patent applications are incorporated herein by reference.

The present invention relates to a method of establishing a data audit trail for meter data of a meter.

Furthermore, the present invention relates to a meter and a computer program according to the present invention and to a computer-readable data carrier having stored thereon the computer program. The present invention relates further to a metering system comprising at least one meter for performing the method according to the present invention.

TECHNOLOGICAL BACKGROUND

Meters and meter data are known and widely used in households and industry. Such meter measure for example the consumption of electricity, gas, or water.

The trusted source of billing relevant data is the meter. A utility can only bill what is in the meter and the meter readings and further information are to be checked at the meter, e.g., energy, demand, tariffs, load profiles, etc. This is inflexible and has certain restrictions. It is thus desirable for future billing that relevant data or tariffs be composed flexibly at a central system using raw billing data from the meter.

To move tariffication to a central system the utility must prove that the bill is based on authentic meter data and the tariffication in the system works as defined in the contract between the utility and a customer. Today, it is required to guarantee that the raw billing data from the meter is from the correct meter, i.e., authentic of source, and has not been altered in any way. i.e., authentic of data. In other words, authenticity of meter data has to be guaranteed.

Going beyond data authenticity while providing a full audit trail of meter data will become relevant. This may become increasingly important in an IoT world, where meter data will be shared and used by different parties and for different use cases or applications.

It is thus a task of the present disclosure to prove the authenticity of the meter data as well as to create a full audit trail of relevant data in a meter or classical smart metering system and for any third-party system which uses data originated in a meter or smart meter and connected devices.

DESCRIPTION OF THE INVENTION

An object of the present invention is to overcome the disadvantages of the prior art. In particular, it is an object of the present invention to provide and to establish a data audit trail for meter data of a meter. The meter data should be verifiable outside of the meter.

This object is achieved by a method, meter, computer program, computer-readable data and metering system according to independent claims, respectively.

In particular, according to the present invention, the object is achieved by a method of establishing a data audit trail for meter data of a meter. The method comprises the steps of capturing a meter dataset comprising at least a first value and a second value, signing the meter dataset with a first digital signature, and subsequently signing a next meter dataset and the first digital signature with a second digital signature.

The method may also comprise the steps of capturing a meter dataset comprising a time stamp value and at least one of a consumption measurement value and an event related value, signing the meter dataset with a first digital signature, and subsequently signing a next meter dataset and the first digital signature with a second digital signature.

A further alternative method of establishing a data audit trail of meter data with a utility meter may comprise the steps of generating a meter dataset comprising a time stamp value and at least one of a utility consumption value and an event related value, providing the meter dataset with a first digital signature, and validating the signed meter dataset with a second digital signature.

With a signature over a whole row of data, it is possible to prove authenticity of meter data in a profile and event log. By adding a signature of the previous capturing row to each row it is possible to form an audit trail, which links all data from the first entry to the last one. With such structure of signatures, it is possible to maintain a full audit trail over all levels of meter or smart metering systems and associated third party systems. The authenticity and correctness of the meter data can be verified externally, i.e., remote from the meter.

Even if only the latest data is available at its origin, i.e., in the meter, all data in any upper system can be validated against the data and/or signature in the meter and systems.

In a world of IoT, where data flows between many systems and parties to allow applications and business opportunity audit trails for data become relevant. It is advantageous that the audit trail can be implemented using little recourses, which qualifies it for any modern meter or smart meter.

In an embodiment a further meter dataset and the second digital signature is subsequently signed with a third digital signature. By doing so the data audit trail for meter data of the meter is further developed. Further meter datasets are processed similarly to establish a verifiable trail.

The meter can be any meter or utility meter that measures for example the consumption of electricity, gas, or water. The meter signs the values it creates.

In a further embodiment a hash value is generated from the meter dataset before subsequently signing the meter dataset. This allows to map the meter dataset of arbitrary size to fixed-size values. The fixed-size hash values are then signed by the digital signature using a private key of the meter.

When the meter dataset comprises a time stamp value or time reference, the exact time of when the meter dataset was captured is known and can be restored at a later point in time. The meter data with time stamp values may be recoded in a profile log. The meter dataset can comprise various or multiple measurement values, also referred to as measurement or measured value tuples. The values may refer to demand and supply.

The meter dataset can also comprise one or more event related values. The meter data with event related values may be recoded in an event log. This allows to subsequently trace back which events have occurred.

If one or more signed meter datasets are transmitted to an external device, then the signed meter datasets or meter data and data consistency over the whole data chain can be authenticated remotely while the established data audit trail of the meter data can be verified.

The transmission can be performed in intervals. The intervals can be defined by time or an event. The registration period can be set to e.g. 15 minutes. The meter may transmit the signed meter data via wired or wireless communication means and can use a communication module.

Each digital signature can comprise a public key of the meter. The key is meter specific. The use of asymmetric cryptography, also referred to as public-key cryptography and in particular the use of elliptic curve cryptography, is considered to be secure and trusted. With public-key cryptography, robust authentication is possible.

It is advantageous that the signed meter data can be validated by private-key cryptography. That means only the person or entity having the respective private key and being authorised is allowed to verify the data.

If hash values of signed meter data can be decrypted, the original meter data can be authenticated. Depending on the jurisdiction, such data may not be allowed to be stored after a certain time.

A further aspect of the present invention concerns a meter or utility meter that is configured to carry out the steps of capturing a meter dataset comprising at least a first value and a second value, signing the meter dataset with a first digital signature, and subsequently signing a next meter dataset and the first digital signature with a second digital signature.

In yet a further aspect of the present invention a metering system may comprise at least one meter and at least one administration device which can be any external system including a head end system (HES).

With a computer program for establishing a data audit trail for metering data of a meter, the object is achieved in that the computer program comprises instructions which, when the computer program is executed by a meter and/or an administration device in a metering system, cause the meter and/or the administration device to carry out the steps of a method according to the present invention.

A computer-readable data carrier according to the present invention has stored thereon a computer program according to the present invention.

A meter or electricity meter according to the present invention achieves the object in that the meter is configured to carry out a method according to the present invention.

The object is also achieved by a metering system, in that the metering system comprising at least one meter according to the present invention and/or at least one administration device configured to carry out a method according to the present invention.

These solutions according to the present invention have the advantage over technologies known from the prior art in that meter data and data consistency over the whole data chain becomes verifiable outside of the meter. Data integrity and data consistency issues can be detected by effective means.

The solutions according to the present invention can be combined as desired and further improved by the following embodiments that are advantageous on their own in each case. Unless specified to the contrary, the embodiments can be readily combined with each other. A skilled person will easily understand that all apparatus features of devices and systems according to the present invention may as well be implemented as and/or constitute steps of a method and/or computer program according to the present invention and vice versa.

BRIEF DESCRIPTION OF THE ACCOMPANYING DRAWINGS

The invention will be described hereinafter in more detail and in an exemplary manner using advantageous embodiments and with reference to the drawings. The described embodiments are only possible configurations in which, however, individual features as described above can be provided independently of one another or can be omitted.

In the drawings:

FIG. 1 shows a schematic diagram illustrating an exemplary schematic architectural illustration of an electricity metering system comprising an electricity meter according to an embodiment of the present invention;

FIG. 2 shows a further schematic diagram illustrating an exemplary schematic architectural illustration of an electricity metering system comprising an electricity meter according to an embodiment of the present invention;

FIG. 3 shows an exemplary structure of smart meter profile log according to the present invention;

FIG. 4 shows an exemplary structure of smart meter event log according to the present invention;

WAYS OF EXECUTING THE INVENTION

Figure 5:
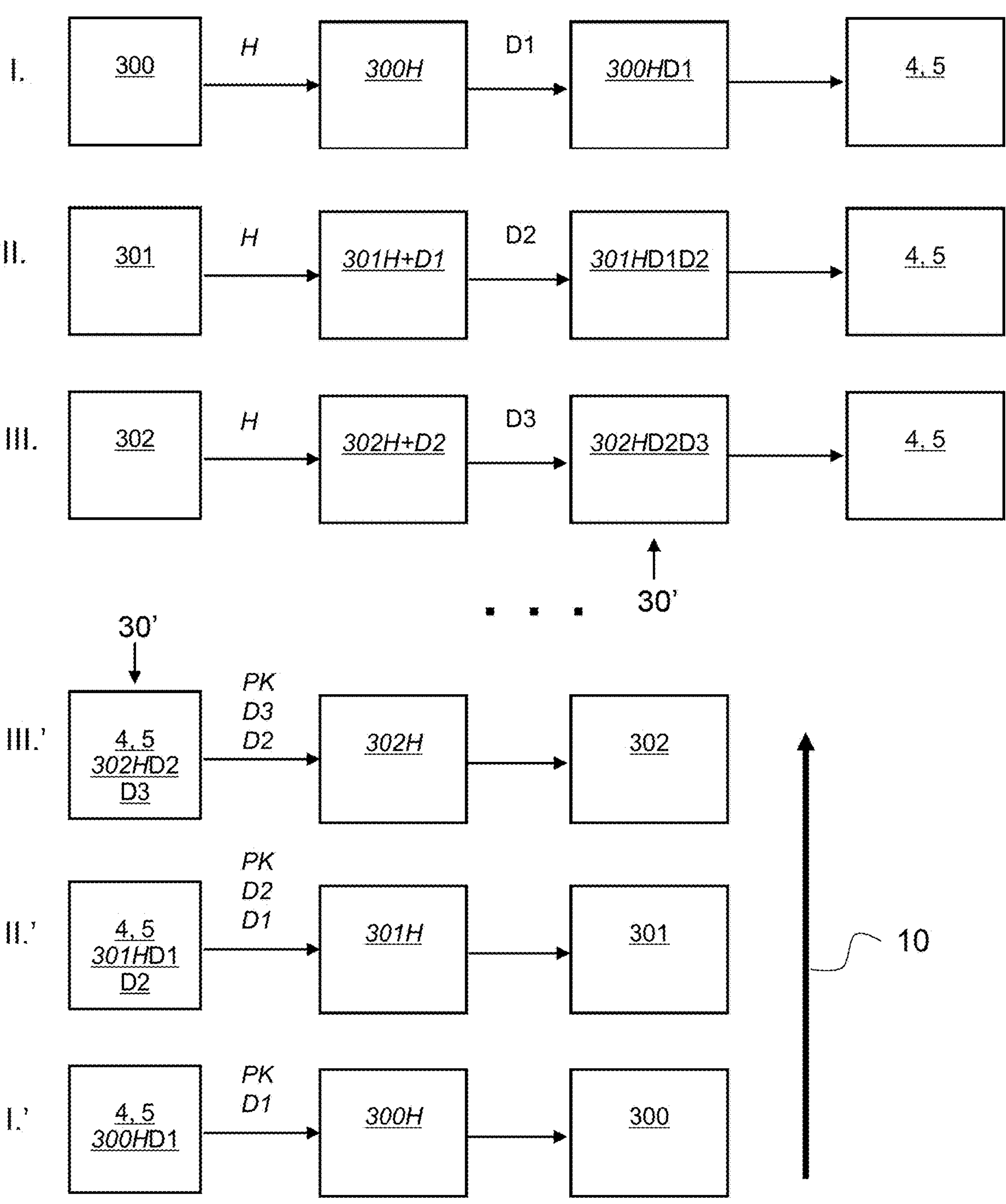
FIG. 5 shows an exemplary illustration of signing and transmitting of meter data from the profile log and the inversion for verification.

FIG. 1 shows a schematic diagram illustrating an exemplary schematic architectural illustration of an electricity metering system 1 comprising an electricity meter 2, a communication infrastructure device 3, an administration device 4, such as a Head-End system (HES) in the form of a computer, server, or alike, for administrating and controlling the electricity metering system 1. The electricity metering system 1 may further comprise an additional system or admin device 5. The electricity meter 2 is also referred to as smart meter 2 or meter 2.

The communication infrastructure device 3 that may comprise a data concentrator is located at remote sites and can be a range of devices such as computers, PLCs, or other devices that connect to field instruments, such as the electricity meter 2 or gas or whatever meter 2.

Control and administration of the metering system 1, in particular of the electricity meter 2, hereafter also referred to as meter 2, and the administration device 4 and/or admin device 5 is performed with the help of a computer program. The computer program can be provided on a computer-readable data carrier configured to be accessed by the electricity meter 2 and/or the administration device 4, 5. Alternatively, or additionally, the computer program can be provided as being carried on a data carrier signal. The data carrier signal or any other kind of data and/or information, can be exchanged between the meter 2 and the administration device 4 or admin device 5 via energy and/or information transmission lines. The energy and/or information transmission lines may be established in a wired and/or wireless manner. For receiving and sending data and information via the energy and/or information transmission line, the electricity meter 2 is provided with transmission means, in the form of a wired or wireless communication line, antenna, or alike. Furthermore, the electricity metering system 1 comprises electrical lines in the form of cables or wires for transmitting electrical power to be metered by the electricity meter 2.

FIG. 2 shows a further schematic diagram illustrating an exemplary schematic architectural illustration of an electricity metering system 1 comprising an electricity or smart meter 2, a Head-End system (HES) device 4, an additional system or admin device 5, and a storage device 6. All devices or systems are connected to and via a network 7.

FIG. 3 shows an exemplary structure of smart meter profile log according to the present invention generated by an electricity meter 2.

FIG. 3 illustrates meter data 30 with meter datasets 300, 301, 302, . . . 300*n* in various columns and rows. As a first value 31 in the first column are indicated time values captured and sorted by sequence. As a second value 32 values or event numbers are indicates. Further columns may indicate status or further values. At the right-hand side of the table a first digital signature D1 is shown. This first digital signature D1 results from signing the meter dataset 300. Subsequently a next meter dataset 301 is shown which is signed including the first digital signature D1 with a second digital signature D2 as indicated at the right-hand column. A further meter dataset 302 and the second digital signature D2 are singed with a third digital signature D3 and so on.

With the respective signature D1, D2, D3, . . . Dn over the whole row of data, it is possible to prove authenticity of the meter data 30 in the profile log. In other words, by adding and using the signature of the previous capturing row to each row it is possible to form an audit trail 10, which links all data from the first entry to the last one.

FIG. 4 shows an exemplary structure of smart meter event log according to the present invention.

FIG. 4 shows meter data 40 with multiple meter datasets 400, 401, 402, . . . 400*n* in various columns. As a first value 41 in the first column are indicated events captured and listed by sequence. As a second value 42 event values or event information may be stored. Further columns may indicate a status and/or further values such as time and/or dates. At the right-hand side of the illustration a first digital signature D1 is shown. This first digital signature D1 results from signing the meter dataset 400 with event 245. Subsequently a next meter dataset 401 is shown which is signed including event 280 and the first digital signature D1 with a second digital signature D2 as indicated at the right-hand column. A further meter dataset 402 with event no. 2 and the second digital signature D2 are singed with a third digital signature D3.

With the respective signature D1, D2, D3, . . . Dn over the whole row of data, it is possible to prove authenticity of the meter data 40 in the event log. In other words, by adding and using the signature of the previous capturing row to each row it is possible to form an audit trail 10, which links all data from the first entry to the last one.

FIG. 5 shows an exemplary illustration of signing and transmitting of meter data 30 from the profile log and the inversion for verification.

Row I. from left to right indicates the evolution of a meter dataset 300. From the meter dataset 300 a hash value 300H is generated. This hash value 300H is signed with a first digital signature D1. The value 300H/D1 also referred to as signed meter data 30' is transmitted to the HES or administration device 4 and/or admin device 5. Subsequently as indicated in row II. from a next meter dataset 301 a hash value 301H+D1 is generated. This hash value 300H+D1 is signed with a second digital signature D2. The value 301H/D1D2 or signed meter data 30' is transmitted to the HES or administration device 4 and/or admin device 5. Subsequently in a further step as indicated in row III. from a further meter dataset 302 a hash value 302H+D2 is generated. This hash value 302H+D2 is signed with a third digital signature D3. The value 302H/D2D3 or signed meter data 30' is transmitted to the HES or administration device 4 and/or admin device 5. The value 302H/D2D3 includes the first digital signature D1 and second digital signature D2.

The signed meter data 30' may be stored at the HES device 4 and/or another admin device 5 and/or the storage device 6 as shown in FIG. 2. With a respective public key PK, as indicated in row III', an inversion for verification can be performed to derive the value 302H and the meter data set 302. In a further step, as indicated in row II', an inversion for verification can be performed by the HES device 4 and/or another admin device 5 to derive the value 301H and/or the meter data set 301. In yet a further step, as indicated in row I', an inversion for verification can be performed by the HES device 4 and/or another admin device 5 to derive the value 300H and the meter data set 300.

All data from the first entry to the last one is linked such that a data audit trail 10 is established and the meter data 30 or meter datasets 300, 301, 302 etc. are verifiable.

Figure 6:
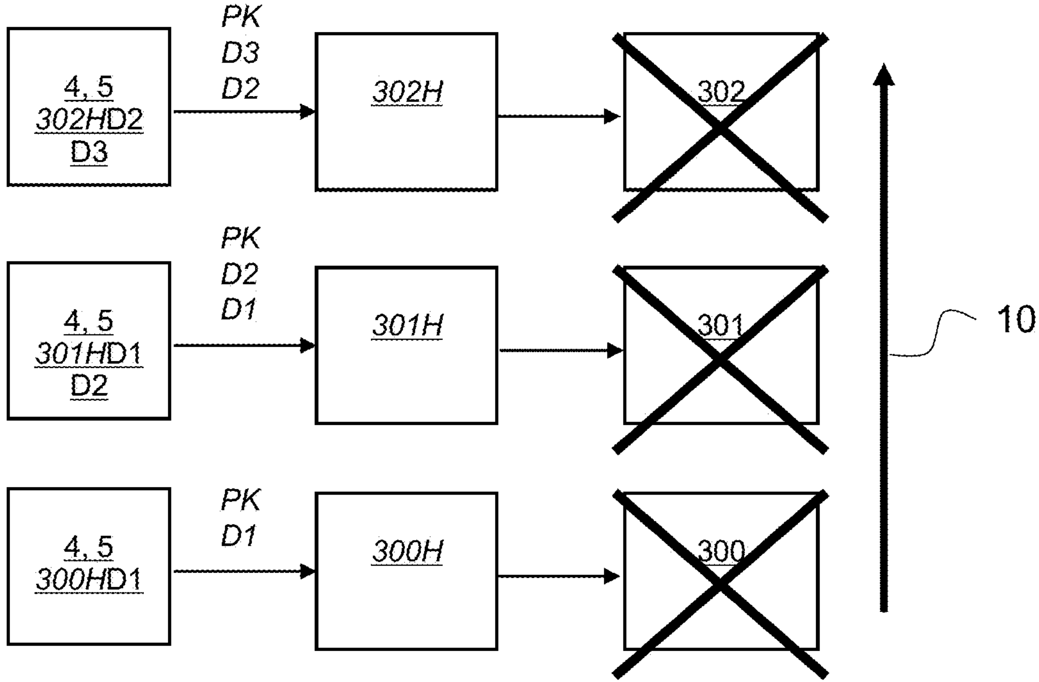
FIG. 6 shows an exemplary illustration of signed meter data with the omission of plain meter data.

FIG. 6 shows an exemplary illustration of signed meter data with the omission of plain meter data 300, 301, 302. It might be requested that meter data after a certain time is not accessible anymore. In that case the plain meter data 300, 301, 302 can be deleted but the integrity of the meter data is still verifiable via the trail 10 as indicated.

With the proposed structure of signatures, it is possible to maintain a full audit trail 10 over all levels of metering or smart metering systems 1 and associated third party systems 4, 5. Even if only the latest data are available at its origin, e.g. in the meter 2, all data in any upper system 4, 5, 6 can be validated against the data/signature in the meter 2.

Figure 7:
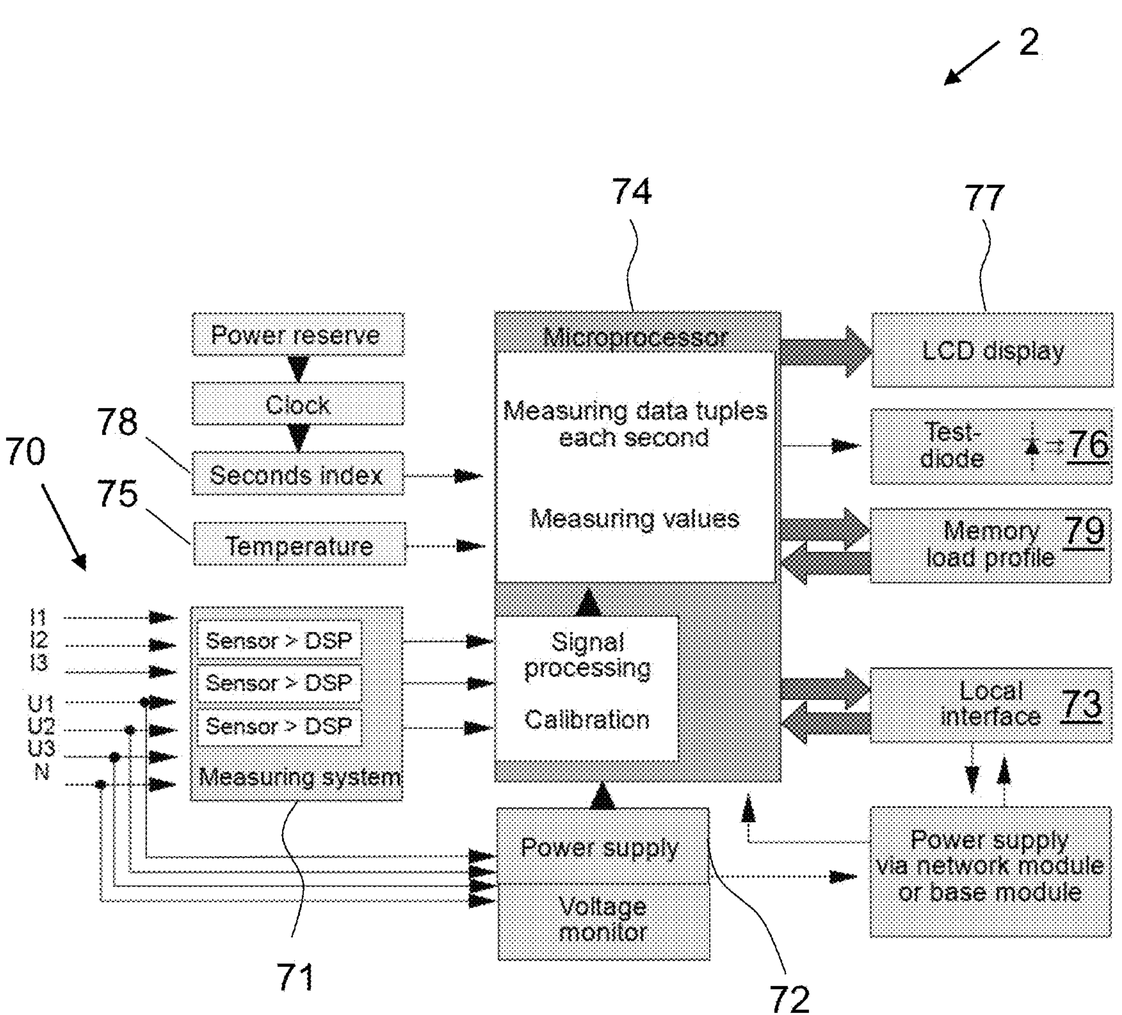
FIG. 7 shows an exemplary illustration of an electricity meter.

FIG. 7 shows an exemplary illustration of an electricity meter 2 or meter 2. The diagram illustrates various functions of the meter 2.

Main inputs 70 of the meter 2 are connections for phase voltages (U1, U2, U3), phase currents (I1, I2, I3), and neutral conductor N for processing in a measuring system 71 and for a three-phase power supply 72 of the meter 2 and other modules 73. The meter 2 comprises a microprocessor 74.

The meter 2 has as outputs a local interface 73, an optical test output 76, and an LCD display 7 for local reading of registered values.

The measuring system 71 comprises three independent single phase measuring systems. The input circuits, voltage divider and sensor-chip, capture voltage and current of the individual phases. A/D-converters digitise these values and feed them to signal processors, which calculate the digital raw values and pass them on to the microprocessor 74. The signal processor calibrates the raw values from the measuring system 71 and determines the following measuring values averaged over a second: active and reactive power per phase; and phase voltages, currents and angles.

The temperature values which are passed on by a temperature sensor 75 to the microprocessor 74 are used for temperature compensation.

A seconds index 78 can be used instead of a device clock. The seconds index 78 can be used to generate a capture period of the load profile, for the transmission of the capture period, as a time stamp in load profiles and event logs, and as a time base. The seconds index 78 is a strictly monotonic increasing natural number which is incremented each second by one with the clock accuracy of the clock generator. It is an unsigned integer number with 32-Bit and is able to cover a time span of approximately 135 years. The seconds index 78 cannot be reset during the lifetime of the meter 2 and therefore does not require any setting or synchronisation mechanisms in contrast to a conventional device clock. A power reserve allows for power>150 h.

A non-volatile flash memory 79 serves to record the load profile and also contains configuration data. An additional flash memory contains the former and, if present, the recently downloaded firmware. In this way, meter data 30, 40 as well as the firmware are secured against loss from voltage failures.

The input signals of the meter 2 are the analog current values I1, I2 and I3 and the analog voltage values U1, U2 and U3. The measuring system 71 generates calibrated digital raw values for voltage and current of each phase from the analog input signals. The signal processor (DSP) calculates the following digital mean values from the voltage and current raw values of each phase, each averaged over one second:

- Active powers P1, P2 and P3 (with energy direction sign)
- Reactive powers Q1, Q2 and Q3 (with energy direction sign)
- Phase voltages U1, U2, U3
- Phase currents I1, I2, I3 and neutral conductor current IN
- Phase angle between voltage U1 and U2 as well as between U1 and U3

It is possible to register the sum of the three phases, the individual phases, phase angles between voltage and current as well as the angle between the voltages U1-U2 and U1-U3.

The microprocessor 74 calibrates the raw values from the signal processors and calculates the following measuring values averaged over 1 second:

- Active powers P1, P2 and P3
- Active power P, sum of L1, L2, L3
- Active energy import +A, sum of L1, L2, L3
- Active energy export −A, sum of L1, L2, L3
- Reactive energies R1, R2, R3, R4
- Phase currents I1, I2, I3 and Neutral conductor current IN
- Phase voltages U1, U2, U3
- Phase angle U2 to U1; Phase angle U3 to U1
- Phase angle I1 to U1
- Phase angle I2 to U2
- Phase angle I3 to U3

The data periodically generated in the measuring system 71 is further processed by the microprocessor or processing unit 74 to signed measuring data or data tuples.

The measuring data is sent each second via a local bus containing the following values:

- current contents of the total registers: +A, −A, R1, R2, R3, R4
- current status
- current seconds index
- device identification (MAC-address)
- signature for +A, R1, R4 (import data packet)
- signature for −A, R2, R3 (export data packet)

There are signatures to enable an interest group (import/export) dependent data evaluation. The signature procedure is based on an ECC (Elliptic Curve Cryptography) method. The secret key used for signing is stored in the meter 2 and cannot be read out. The public key used for the verification of the signature can be read out via the local communication interface 3 and may be printed on a type plate of the meter 2.

In a further embodiment the microprocessor or processing unit 74 of the electricity meter 2 comprises at least one microelectronic primary processor, memory, oscillator and/or supporting circuitry. A communications unit comprises communications microelectronics, such as at least one transceiver or radio transmitter for communication via transmission means or the local interface 73. The power supply unit 72 of the electricity meter 2 comprises power supply circuitry and microelectronics for converting grid supply voltage to voltages suitable for operating internal meter circuitry and components. The supply voltages for the meter electronics are derived from the three-phase network. Phase voltages between 46 V to 1500 V can be used.

Figure 8:
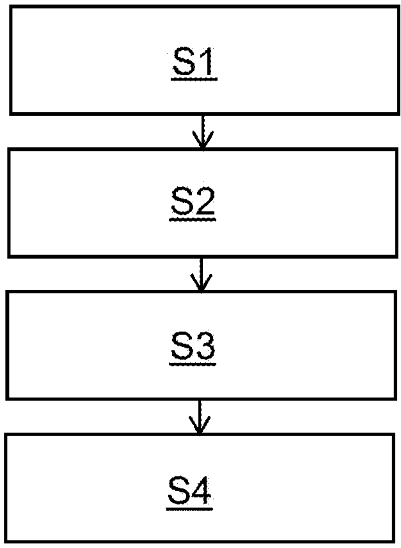
FIG. 8 shows an exemplary flowchart illustrating steps of establishing a data audit trail for meter data according to the present invention.

FIG. 8 shows an exemplary flowchart illustrating steps of establishing a data audit trail 10 according to the present invention. The runtime logic are computer-readable instructions, such as software and/or firmware, constituting at least a part of the computer program, to be executed by the meter 2.

In a first step S1 a meter dataset 300, 400 comprising at least a first value 31, 41 and a second value 32, 42 is captured. In a second step S2 the meter dataset 300, 400 is singed with a first digital signature D1. In a subsequently signing step S3 a next meter dataset 301, 401 and the first digital signature D1 are signed with a second digital signature D2. In yet a further subsequently signing step S4 a further meter dataset 302, 402 and the second digital signature D2 are singed with a third digital signature D3 thereby creating the verifiable data audit trail 10.

In a preferred embodiment, before subsequently signing the meter dataset 300, 301, 302, . . . 300*n*; 400, 401, 402, . . . 400*n* a hash value 300*h*, 301*h*, 302*h*, . . . ; 400*h*, 401*h*, 402*h*, . . . is generated. Digital signatures are usually applied to hash values that represent larger data.

With hash and digital signature functions, the meter data 30, 40 can be digitally signed to signed meter data 30', 40' so that any other user can verify that the data has not been changed since it was signed. The identity of the meter 2 that signed the data can also be verified. A digital signature may comprise a small amount of binary data, typically less than 256 bytes. The signature is bundled with the meter dataset and stored. The next meter dataset is signed including the previous signature and so on.

Cryptographic digital signatures use public key algorithms to provide data integrity. When the meter data 30, 40, i.e. a meter dataset is signed with a digital signature and the next meter dataset with a further digital signature, someone else can verify the signatures, and can prove that the data originated from the meter 2 and was not altered after it was signed, i.e. verify data integrity.

Deviations from the above-described embodiments are possible within the scope of the present invention.

The electricity metering system 1 may comprise electricity meters 2, administration devices 4, 5, computer programs, computer-readable data carriers, data carrier signal, energy and/or information transmission lines, transmission means, and/or electrical lines, in any number and form required for implementing a desired configuration for operating, monitoring and/or controlling the electricity metering system 1 and in particular any electricity meters 2 therein.

The administration device 4, 5, transmission means, processing unit 74, communication unit or local interface 73, and/or power supply units 72 may comprise any kind of electronic data processing, storage, interface and/or operation means in any number and form desired. The energy and/or information transmission lines can be embodied as any kind of wired and/or wireless means for transferring energy, in particular electrical energy, and/or information, such as analogue and/or digital data, including any kind of computer software programs, interfaces, modules and/or functions, as well as communication systems, such as e.g.

the Global System for Mobile Communications (GSM), DLMS/COSEM, Power-line communication (PLC), and alike.

The functions performed by the elements, units and modules of the metering system 1 may be implemented as hardware and/or software in order to be carried out by a single entity and/or multiple entities within the electricity meter 2 and/or the administration device 4, 5. The electricity meter 2 and/or administration device 4, 5 may therefore comprise at least one computer, (micro)processor or other type of processor, and at least one computer-readable medium, such as the computer readable data carrier, which may be embodied as any kind of internal and/or external RAM and/or ROM memory device or data storage as well as corresponding permanent or non-permanent computer and/or machine-readable media, including but not limited to e.g. cloud storage devices, microchips, flash drives, EEPROM, disks, cards, tapes, and drums, tapes, optical discs that stores computer-readable program code (e.g., software or firmware), such as the computer program, executable by the (micro)processor, logic gates, switches, interfaces, gateways, transceivers, an application specific integrated circuit (ASIC), a programmable logic controller, and/or an embedded microcontroller, for example. In particular, the electricity meter 2 and/or the administration device 4, 5 may be configured to perform any kind of measurement, computation, calculation, processing, generation, determination, decision, monitoring and/or control step as described herein.

A method according to the present invention may comprise steps S1 to S4 as required and in any number and form desired to establish a data audit trail 10. Besides electricity meters 2 as described herein, a method according to the present invention as well as corresponding systems 1 comprising administration devices 4, 5, computer programs, computer readable data carriers, data carrier signals, energy and/or information transmission lines, transmission means, and/or electrical lines may be used to establish data audit trails for communications between any kind of electrical appliances, apparatuses, and/or devices, such as household devices, computers, transformers, generators, motors, or alike, in particular devices with a relatively large power input, throughput and/or output. Respective electrical appliances, apparatuses, and/or devices themselves and/or respective administration devices may be configured to carry out a method according to the present invention.

| Reference Signs | |
|---|---|
| 1 | electricity metering system |
| 2 | electricity meter |
| 3 | communication infrastructure device |
| 4 | HES or administration device |
| 5 | any system or admin device |
| 6 | data storage |
| 7 | network |
| 30, 40 | meter data |
| 30' | signed meter data |
| 31, 41 | first value |
| 32, 42 | second value |
| 300 | meter dataset |
| 301 | next meter dataset |
| 302 | further meter dataset |
| 400 | meter dataset |
| 401 | next meter dataset |
| 402 | further meter dataset |
| 70 | main inputs |
| 71 | measuring system |
| 72 | power supply |
| h, H | hash value |
| S1 | first step |
| S2 | second step |
| S3 | third step |
| S4 | fourth step |
| 73 | outputs, other modules, or local interface |
| 74 | microprocessor or processing unit |
| 75 | temperature sensor |
| 76 | optical test output |
| 77 | LCD display |
| 78 | seconds index |
| 79 | non-volatile flash memory |
| D1 | first digital signature |
| D2 | second digital signature |
| D3 | third digital signature |

The invention claimed is:

1. A method of establishing a data audit trail for meter data of a meter, comprising the steps of:
- capturing a meter dataset comprising at least a first value and a second value;
- generating a first hash value from the meter dataset;
- signing the first hash value with a private key of the meter to generate a first digital signature;
- generating a second hash value from a next meter dataset and the first digital signature;
- subsequently signing the second hash value with the private key of the meter to generate a second digital signature; and
- transmitting the meter dataset bundled with the first digital signature and the next meter dataset bundled with the second digital signature to an external device to establish the data audit trail.

2. The method according to claim 1, further comprises:
- generating a third hash value from a further meter dataset and the second digital signature; and
- subsequently signing the further meter dataset and the second digital signature with the private key of the meter to generate a third digital signature.

3. The method according to claim 1, wherein the meter dataset comprises at least one event related value.

4. The method according to claim 1, wherein the meter dataset comprises a time stamp value.

5. The method according to claim 1, wherein the meter dataset comprises at least one measurement value.

6. The method according to claim 1, further comprises the step of validating the signed meter data by private key cryptography.

7. The method according to claim 6, further comprises the step of decrypting hash values of signed meter data.

8. The method according to claim 1, wherein the transmitting is performed in intervals, the intervals being defined by time or an event.

9. The method according to claim 1, wherein each digital signature comprises a public key of the meter.

10. A metering system comprising at least one meter at least one administration device configured to carry out the method of claim 1.

11. A non-transitory computer readable medium having a computer program for establishing a data audit trail for metering data of a meter, comprising instructions which, when the computer program is executed by a meter and/or an administration device in a metering system, cause the meter and/or the administration device to carry out the steps of a method according to claim 1.

12. A meter configured to carry out the method according to claim 1.

* * * * *